July 26, 1960  H. E. METCALF  2,946,229
ROTARY ACTUATOR
Filed April 22, 1957  3 Sheets-Sheet 1
Fig.1
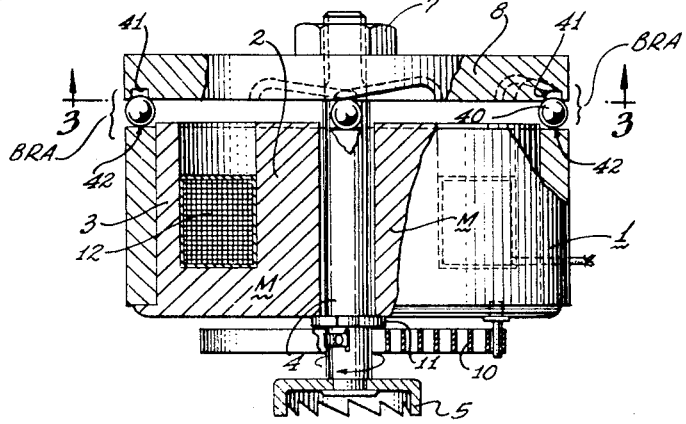
Fig.2
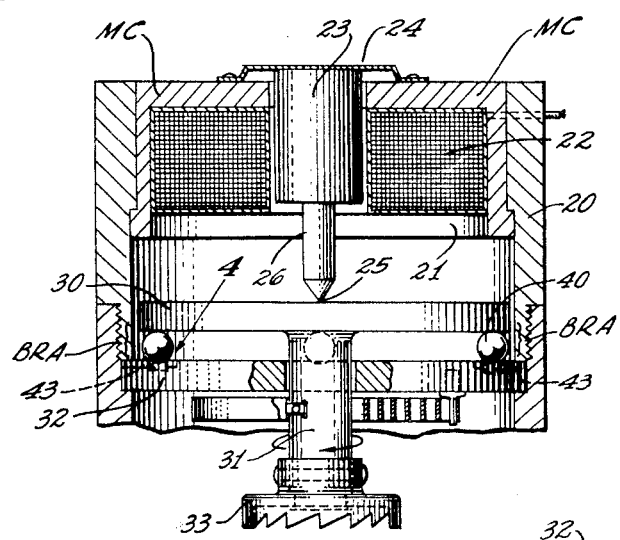
Fig.3
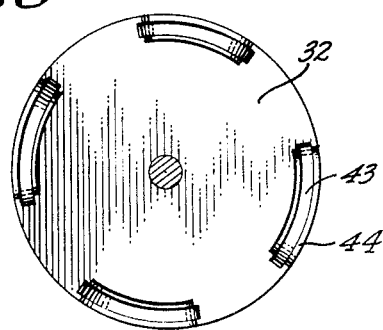
Fig.4
INVENTOR:
Herbert E. Metcalf July 26, 1960
H. E. METCALF
2,946,229
ROTARY ACTUATOR
Filed April 22, 1957
3 Sheets-Sheet 2
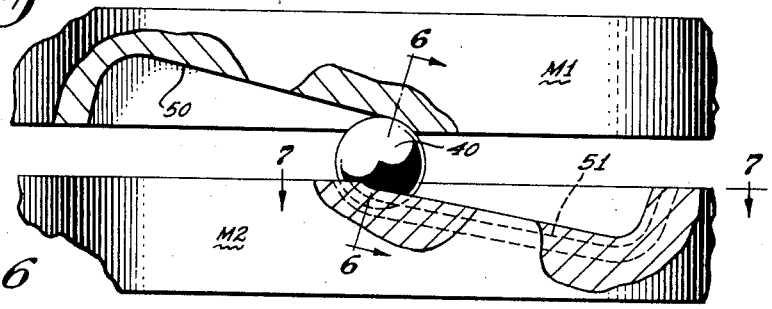
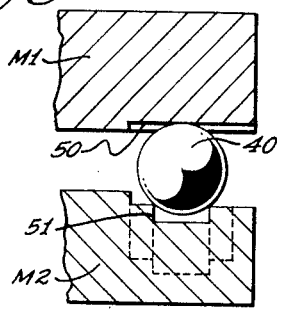
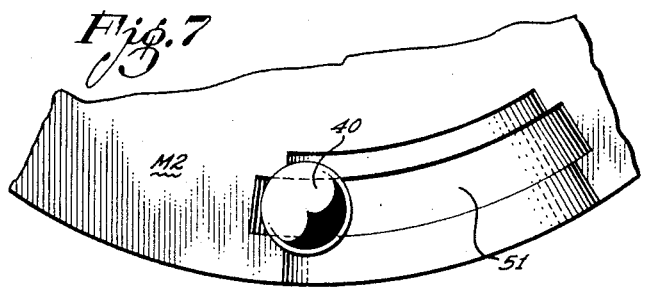
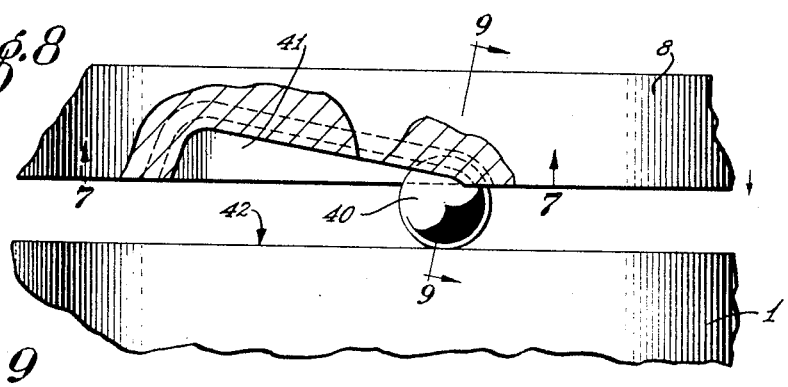
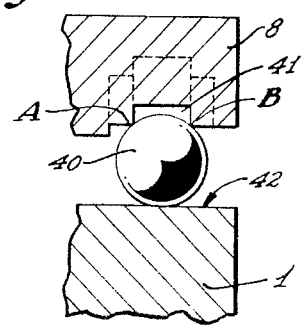
INVENTOR:
Herbert E. Metcalf July 26, 1960  H. E. METCALF  2,946,229
ROTARY ACTUATOR
Filed April 22, 1957  3 Sheets-Sheet 3
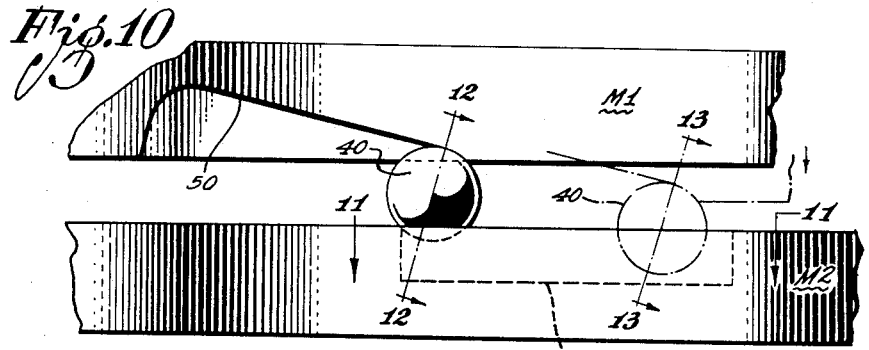
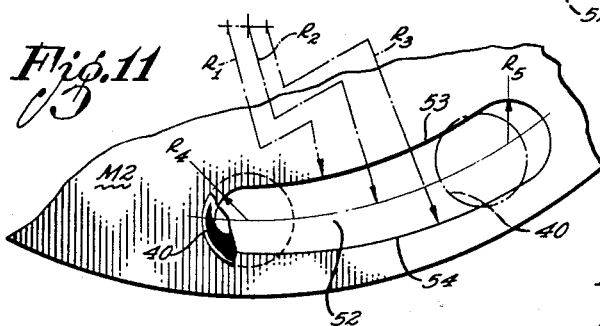
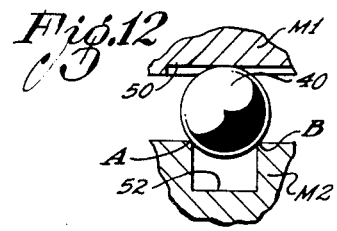
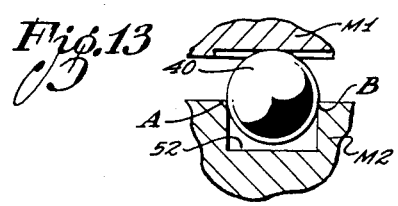
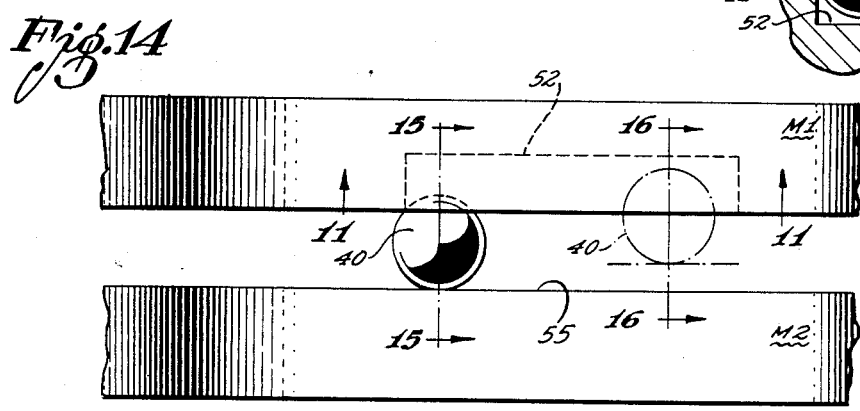
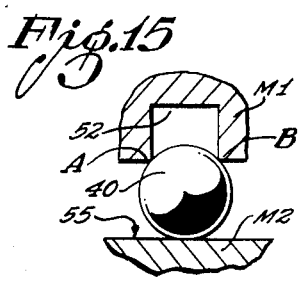
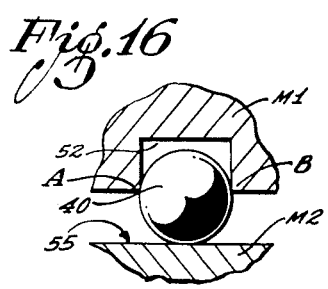
INVENTOR:
Herbert E. Metcalf

United States Patent Office 2,946,229
Patented July 26, 1960

2,946,229

ROTARY ACTUATOR

Herbert E. Metcalf, Malibu, Calif.; Carol R. Metcalf, administratrix of said Herbert E. Metcalf, deceased Filed Apr. 22, 1957, Ser. No. 654,159

9 Claims. (Cl. 74—89)

My invention relates to rotary actuators and more particularly to a rotary actuator having a three point ball bearing between relatively movable members. This invention is a continuation in part of my application Serial No. 623,082, filed November 19, 1956, and is ideally suited for solenoid operation.

Among the objects of my present invention are:

To provide an improved rotary actuator bearing of low friction and high lateral stability.

To provide a solenoid actuated motion converter using ball bearings in which there is a three point ball and race contact.

And to provide a simple and highly efficient solenoid operated motion converter.

Briefly my invention involves a device for converting axial motion into rotary motion of the same general type as shown in German Patent No. 659,975 of May 18, 1935. In such a device a solenoid forces an armature disc in an axial direction toward another coaxial stationary disc. The two discs are coupled by a bearing so designed as to cause the movable disc to rotate over a desired arc as it moves axially. The two motions are imparted to a shaft to drive a switch, counting mechanism or other device, as required.

Two types of rotary actuators are known. In one type, the movable disc is the armature of a solenoid as shown by the cited German patent. In the other type, shown in my cited application, the movable disc is separate from the actuating mechanism providing the axial motion, which may be a solenoid core, a cam or a pneumatic piston or other similar mechanisms. The present invention is applicable to both types of structure.

Briefly, my invention may include two coaxial members, one rotatable, one stationary. A slot race, either having slanted edges, coplanar parallel edges, or diverging coplanar edges is formed in one member and a surface race, either slanted axially or in a plane normal to the axis, is provided in the other member. A ball is positioned between the slot and surface bearing only on the edges of the slot and on the surface, thereby providing a three point ball contact. Combinations of races result in the same overall action of the device of converting axial to rotary motion. In operation, means are provided to impart axial motion to the movable member. The races in individual pairs may both be directed to cause rotation of the rotatable disc, or only one.

The invention can be more fully understood by reference to the drawings in which:

Figure 1 is a view, partly in section and partly in elevation, of a solenoid operated rotary actuator in which the movable member is the solenoid armature.

Figure 2 is a view, partly in section and partly in elevation, of a solenoid operated rotary actuator in which the movable member is separate from the solenoid core.

Figure 3 is a plan view of the armature races, taken as indicated by the line 3—3 in Figure 1.

Figure 4 is a perspective view of an armature race as used in Figure 2, taken as indicated by the arrow 4 in Figure 2.

Figure 5 is a side view partly in section and partly in elevation of slanted surface and slot races.

Figure 6 is a cross sectional view taken as indicated by the line 6—6 in Figure 5.

Figure 7 is a plan view of the slanted slot race taken as indicated by the line 7—7 in Figures 5 and 8.

Figure 8 is a side view partly in elevation and partly in section of a slant slot-surface race assembly.

Figure 9 is a cross sectional view taken as indicated by line 9—9 in Figure 8.

Figure 10 is a side view in elevation of a flat slant surface, diverging edge slot race assembly.

Figure 11 is a plan view taken as indicated by line 11—11 in Figure 10.

Figure 12 is a cross sectional view taken as indicated by line 12—12 in Figure 10.

Figure 13 is a cross sectional view taken as indicated by line 13—13 in Figure 10.

Figure 14 is a side view in elevation of a surface, diverging edge slot race combination.

Figure 15 is a cross sectional view taken as indicated by line 15—15 in Figure 14.

Figure 16 is a cross sectional view taken as indicated by line 16—16 in Figure 14.

The rotary actuator of my invention is ideally adapted for use with solenoid actuation in two types of structure for example, as shown in Figures 1 and 2.

Referring first to Figure 1, a cylindrical case 1 is closed at one end with a magnetic circuit M having a hollow central pole piece 2 and an outer cylindrical pole piece 3, both preferably terminating inwardly in the same plane. A central shaft 4 passes through the central pole piece 2 for axial and rotary movement, terminating outwardly in a jaw clutch 5 and inwardly by attachment as by nut 7 to an armature disc 8 positioned to be attracted by pole pieces 2 and 3. Disc 8 and casing 1 are coupled either by four ball and race assemblies BRA as indicated in Figure 3, or three assemblies, as may be desired. These assemblies may be of several types as will be described later.

A return spring 10 is attached between shaft 4 and the magnetic circuit M to maintain the armature normally away from poles 2 and 3. Retaining ring 11 on shaft 4 determines the armature return position. A solenoid winding 12 is placed between pole pieces 2 and 3 to attract armature 8 when energized.

In the modification shown in Figure 2, the movable disc is separate from any solenoid component. In this figure, the casing 20 is also closed at one end by a magnetic circuit MC which in this case includes shoulder 21 supporting a solenoid winding 22, and a central core 23 movable inwardly and axially upon energization of winding 22. A retainer bracket 24 retains the core 23 in the winding 22.

A central point 25 on core projection 26 bears axially on a movable disc 30, on which is mounted shaft 31 extending outwardly through stationary casing end disc 32, to terminate in a jaw clutch 33 for example.

Discs 30 and 32 are coupled with ball race assemblies BRA as will be later described.

In order that there may be the desired three point ball contact only between the races, the ball bearing assembly should have one slot type race, with the ball contacting the edges only of the slot, and one surface race on which the ball rolls with a single point contact. The ball path in at least one of the races is slanted axially or shaped to direct the ball axially; and both races, or at least the ball paths in both races, also extend circumferentially around the axis in order that an axial movement of the member carrying a ball race can and will also cause a rotary movement of that latter member.

The types of race combinations which can perform such a function when a ball is placed therebetween can be as follows, for example:

(1) A slanted slot and a single ball contact surface member.

(2) A slanted surface and a parallel edged slot in a flat surfaced member with the surface normal to the axis.

(3) A slanted surface and a diverging edge slot in a single ball contact surface normal to the axis of the shaft.

(4) A diverging edge slot and a single ball contact surface normal to the axis of the shaft.

(5) A slant surface opposed to a slanted edge slot.

For the same slot or surface length, the use of a race combination where the ball has one contact with a surface normal to the axis, the rotation angle and ball path is equal to the length of the race path length.

In the other combinations described the permissible rotation angle and the ball path can be twice the race path length.

All of these combinations will now be briefly described.

In Figure 1 for example, a ball 40 is positioned between an upper (as illustrated) slanted slot race 41 providing a two point ball contact and a lower surface 42 providing a single point ball contact which is the upper end surface of the casing cylinder 1, this surface 42 being normal to the axis of shaft 4. This arrangement is shown in enlarged detail in Figures 8 and 9. Referring to these figures, it will be seen in Figure 9 that ball 40 has one point contact on slot edge A, a second point contact on slot edge B and the third point contact on flat surface 42. In this embodiment the axial travel is limited to the difference in the depths of the slot ends, and the rotary angle is limited by the length of the ball path as determined by the ends of the slot 41.

The ball race arrangement in the device of Figures 2, 3 and 4 is the same except that in this instance the slot 43 is cut into stationary disc 32 with the flat surface on the moving disc 30. It is convenient to mill slot 43 into a milled slant surface 44 in disc 32.

In Figure 5 I have shown the use of a slant surface 50 in one member M1 and a slanted slot 51 in the other member M2. It is immaterial which one is the movable member. Here also ball 40 rolls with only one contact on slant surface 50 but with two slot edge contacts as shown in Figures 6 and 7. In this combination the permissible rotation is the sum of angular extents of the opposed races, and the axial motion is the sum of the ball penetration into the members M1 and M2.

In the combination of Figure 10, a slant surface 50 is used in one member M1, and a slot 52 with diverging curvilinear edges 53 and 54 in the other member as shown in Figure 11. This type of diverging edge slot is used in the actuator shown, described and claimed in my application Serial No. 623,082 cited above. In this type of slot the ball path radius R2 is preferably centered on the axis of shaft 4, the inner radius R1 is off center as is radius R3 to provide the desired edge divergence. As the ball 40 rolls along slant surface 50 is simultaneously rolls along the edge surfaces A and B of slot 52 and sinks deeper into member M2 as the ball rolls toward the wide end of slot 52 as best shown in Figures 12 and 13. In this combination the rotation angle is twice the individual race path length.

The divergent edge slot 52 as shown in Figures 10, 11, 12 and 13 can also be used with a flat surface 55 normal to the axis of shaft 4 as shown in Figures 14, 15 and 16. Here again the ball 40 rolls only on the edges A and B of the diverging edge slot 52 with only a single contact with flat surface 55.

Thus in all cases, a strictly three point contact only between ball and opposed races is maintained, two of these contacts, i.e. the slot edge contacts, describing a path on the ball less than a great circle, the other describing a great circle path as the ball rolls. Thus wear is distributed over three race paths and over three ball paths with consequent long life.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

I claim:

1. A rotary actuator comprising a pair of coaxial members, one of said members being stationary, the other member being mounted to be moved axially and rotatably with respect to the other member, a plurality of slant surfaces on one of said members directed axially and circumferentially, a plurality of slots in said other member opposed to cooperate with said slant surfaces, the edges of said slots being directed generally circumferentially, and a ball positioned between each opposed slot and surface, said ball having three points of contact only, comprising one contact with said slant surface and contact only with the two edges of said opposed slot.

2. A rotary actuator comprising a pair of coaxial members, one of said members being stationary, the other member being mounted to be moved axially and rotatably with respect to the other member, a plurality of slant surfaces on one of said members directed axially and circumferentially, a plurality of slots in said other member opposed to cooperate with said slant surfaces, the edges of said slots being directed generally circumferentially, and a ball positioned between each opposed slot and surface, said ball having three points of contact only, comprising one contact with said slant surface and contact only with the two edges of said opposed slot, the edges of said slot being slanted on the same angle as the slant of the opposed surface.

3. A rotary actuator comprising a pair of coaxial members, one of said members being stationary, the other member being mounted to be moved axially and rotatably with respect to the other member, a plurality of slant surfaces on one of said members directed axially and circumferentially, a plurality of slots in said other member opposed to cooperate with said slant surfaces, the edges of said slots being directed generally circumferentially, and a ball positioned between each opposed slot and surface, said ball having three points of contact only, comprising one contact with said slant surface and contact only with the two edges of said opposed slot, the edges of said slot being divergent to permit said ball as it rolls on said slant surface and said edges, to move axially with respect to the slot bearing member.

4. A rotary actuator comprising a pair of coaxially mounted members, one of said members being stationary the other of said members being mounted to be moved axially and rotatably with respect to said other member, a pair of cooperative ball races formed in said members, one of said races being a flat surface the other of said races being the two edges of a slot, both of said races being circumferentially directed, a ball positioned between said races and making a three point contact only between said flat surface and said edges only, at least one of said races being shaped to permit said ball to roll in an axial direction as said movable member is rotated.

5. A rotary actuator comprising a pair of coaxially mounted members, one of said members being stationary the other of said members being mounted to be moved axially and rotatably with respect to said other member, a pair of cooperative ball races formed in said members, one of said races being a flat surface the other of said races being the two edges of a slot, both of said races being circumferentially directed, a ball positioned between said races and making a three point contact only between said flat surface and said edges only, at least one of said races being shaped to permit said ball to roll in an axial direction as said movable member is rotated, and vice versa over a repetative path.

6. A rotary actuator comprising a stationary member, a generally parallel movable member mounted to rotate and to move axially toward and away from said stationary member, a plurality of stationary ball races on said stationary member, a plurality of races forming a part of and rotating with said rotatable member, a ball positioned between each pair of said races to couple said members, said races being shaped to provide a generally circular ball path in an orbit generally centered on the axis of rotation of said rotatable member, one of the races in each pair being a slot of lesser width throughout than the diameter of the ball whereby said ball will contact the edges only of said slot, the other of said races being a surface contacting the ball over a great circle path only, at least one of said races being shaped to provide a ball path during rotation having an axial extent so that said rotatable member simultaneously can move axially as it rotates on said balls, said races being opposed in pairs.

7. Apparatus in accordance with claim 1 wherein one of said races in each pair is an axially slanted slot and the other race in said pair is a flat surface normal to said axis.

8. Apparatus in accordance with claim 1 wherein one of said races in each pair is an axially slanted surface and the other race in each pair is a diverging edge slot in a surface normal to said axis.

9. Apparatus in accordance with claim 1 wherein one of said races in each pair is an axially slanted slot and the other race in each pair is an axially slanted surface.

References Cited in the file of this patent
UNITED STATES PATENTS

| | | |
|---|---|---|
| 2,328,501 | Schanzer | Aug. 31, 1943 |
| 2,395,784 | Honegger | Feb. 26, 1946 |
| 2,430,940 | Leland | Nov. 18, 1947 |
| 2,617,949 | Leland | Nov. 11, 1952 |
| 2,828,636 | Hall | Apr. 1, 1958 |